United States Patent
Olson et al.

(10) Patent No.: US 9,826,288 B2
(45) Date of Patent: Nov. 21, 2017

(54) SENSING SYSTEM FOR AN AUTOMATED VEHICLE

(75) Inventors: Michael R. Olson, Brooklyn Park, MN (US); Jack Zeng, Eden Prairie, MN (US)

(73) Assignee: SAUER-DANFOSS INC., Ames, IA (US)

( * ) Notice: Subject to any disclaimer, the term of this patent is extended or adjusted under 35 U.S.C. 154(b) by 191 days.

(21) Appl. No.: 13/334,590

(22) Filed: Dec. 22, 2011

(65) Prior Publication Data

US 2013/0124010 A1    May 16, 2013

Related U.S. Application Data

(63) Continuation-in-part of application No. 13/298,105, filed on Nov. 16, 2011.

(51) Int. Cl.
*E01C 19/00* (2006.01)
*H04Q 9/00* (2006.01)

(52) U.S. Cl.
CPC ............ *H04Q 9/00* (2013.01); *E01C 19/006* (2013.01); *H04Q 2209/47* (2013.01)

(58) Field of Classification Search
CPC ..... H04Q 9/00; H04Q 2209/47; E01C 19/006
USPC .......................................................... 701/2
See application file for complete search history.

(56) References Cited

U.S. PATENT DOCUMENTS

| | | | |
|---|---|---|---|
| 4,558,444 A * | 12/1985 | Kennedy et al. | 370/229 |
| 4,587,651 A * | 5/1986 | Nelson et al. | 370/405 |
| 4,861,191 A | 8/1989 | Smith et al. | |
| 5,356,238 A * | 10/1994 | Musil et al. | 404/84.1 |
| 5,452,966 A | 9/1995 | Swisher, Jr. | |
| 5,484,226 A * | 1/1996 | Emerson et al. | 404/84.05 |
| 5,529,434 A | 6/1996 | Swisher, Jr. | |
| 6,109,568 A * | 8/2000 | Gilbert et al. | 246/3 |
| 6,109,825 A * | 8/2000 | Yon | 404/84.05 |
| 6,384,420 B1 * | 5/2002 | Doriguzzi Bozzo | 250/548 |
| 6,405,132 B1 * | 6/2002 | Breed et al. | 701/301 |
| 6,509,828 B2 * | 1/2003 | Bolavage et al. | 340/10.1 |
| 6,904,266 B1 * | 6/2005 | Jin et al. | 455/20 |
| 8,929,196 B2 * | 1/2015 | Novak et al. | 370/208 |
| 2003/0093187 A1 * | 5/2003 | Walker | 701/1 |

(Continued)

FOREIGN PATENT DOCUMENTS

| | | |
|---|---|---|
| DE | 102006035187 A1 | 1/2008 |
| EP | 2177965 | 4/2010 |

(Continued)

OTHER PUBLICATIONS

IEEE:IEEE Standard for Local and Metropolitan Area Networks—Part 15.4: Low-Rate Wireless Personal Area Networks (LR-WPANs)—IEEE Std 802.15-4-2011. May 9, 2011.

(Continued)

*Primary Examiner* — Behrang Badii
*Assistant Examiner* — Daniel L Greene
(74) *Attorney, Agent, or Firm* — Zarley Law Firm, P.L.C.

(57) ABSTRACT

A sensing system for providing vehicle automation. The system includes a master controller that is electrically connected to a receiver that has a transceiver that provides over-the-air communication to a plurality of wireless sensors. The transceivers receive information from the plurality of wireless sensors in order to automate the steering and elevation of the vehicle.

18 Claims, 3 Drawing Sheets

(56) References Cited

U.S. PATENT DOCUMENTS

| | | | | |
|---|---|---|---|---|
| 2004/0246100 A1* | 12/2004 | Kranz | ............................ | 340/10.1 |
| 2005/0012593 A1* | 1/2005 | Harrod et al. | ................ | 340/5.72 |
| 2009/0183886 A1* | 7/2009 | Armas | .................. | E02F 3/3414 |
| | | | | 172/779 |
| 2010/0134308 A1 | 6/2010 | Barnardo et al. | | |
| 2011/0118869 A1* | 5/2011 | Smith et al. | ................... | 700/218 |
| 2011/0255918 A1* | 10/2011 | Worsley et al. | ............. | 404/84.1 |
| 2011/0306367 A1* | 12/2011 | Cahill | ............................ | 455/464 |
| 2012/0320916 A1* | 12/2012 | Sebastian | ....................... | 370/390 |

FOREIGN PATENT DOCUMENTS

| | | |
|---|---|---|
| EP | 2284635 | 2/2011 |
| EP | 2208019 B1 | 6/2013 |
| WO | 2008150448 | 12/2008 |
| WO | 2010139013 | 12/2010 |
| WO | 2011032208 | 3/2011 |

OTHER PUBLICATIONS

DE102006035187_English Abstract.
English Translation—German Office Action issued by the German Patent and Trade Mark Office (DPMA) dated Jun. 23, 2017; German Patent Application No. DE201210220956.

* cited by examiner

SENSING SYSTEM FOR AN AUTOMATED VEHICLE

CROSS REFERENCE TO A RELATED APPLICATION

This application is a continuation-in-part of U.S. patent application Ser. No. 13/298,105 filed Nov. 16, 2011.

BACKGROUND OF THE INVENTION

This invention relates to a sensing system for following a surface. More specifically, this invention relates to a wireless mechanical surface following system for construction equipment.

Often there is importance in having construction machines such as road paving machines be able to drive in a straight line and at a predetermined elevation. Currently string line sensors and surface sensors are placed far away from the body of the construction machine in close proximity to people and other moving construction moving vehicles. The cables for the sensors and the connector on the sensors themselves often get damaged because of the close proximity of traffic on a busy construction site. The sensor cables must be connected to the control system on the body of the machine which can be up to 30 feet away which exposes the cables to further damage.

Thus, a need in the art exists for a way to eliminate these physical cables but still be able to accurately navigate the machines. Such elimination of cables would similarly minimize the risk of shutting down machine operation because of damage to such cable. In addition, eliminating the cable would provide additional safety for such road construction workers.

Thus, a principal object of the present invention is to provide a sensing system for following a surface utilizing wireless technologies.

Yet another object of the present invention is to eliminate risks associated with cables.

These and other objects, features, and advantages will become apparent from the specification and claims.

BRIEF SUMMARY OF THE INVENTION

A sensing system for controlling the steering and elevation controls of a vehicle. The system includes a master controller and at least one receiver having a first transceiver in electric communication with the master controller. A plurality of wireless sensors are fixed remote to the vehicle and are each in over-the-air communication with the first transceiver of the receiver in order to communicate data from the sensors to the first transceiver.

DETAILED DESCRIPTION OF THE PREFERRED EMBODIMENT

Figure 1:
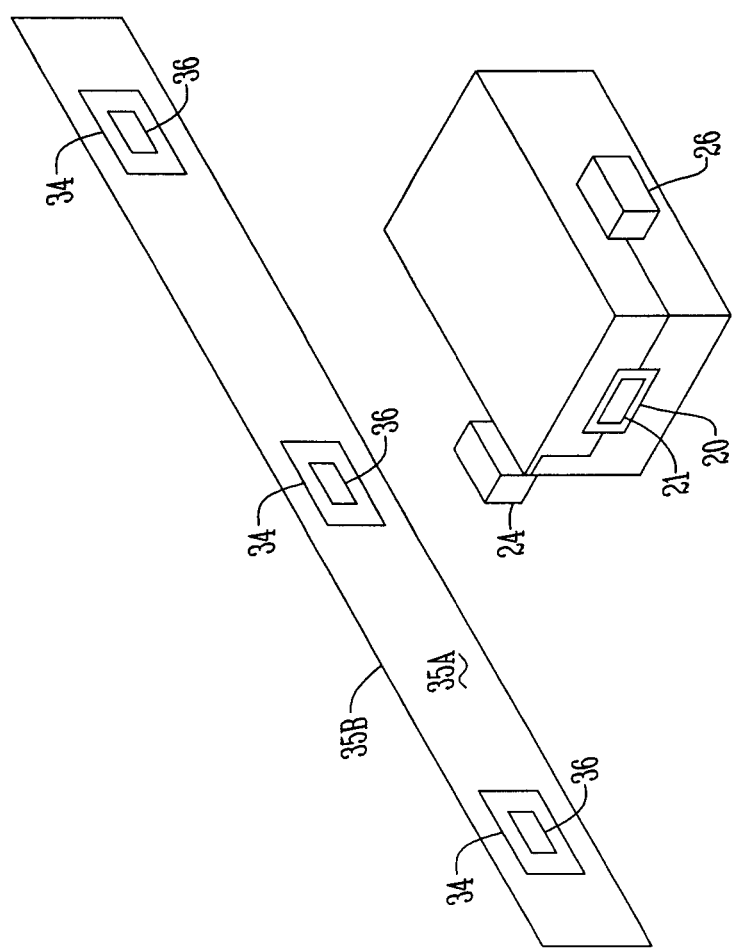
FIG. 1 is a top schematic diagram of a sensing system.

The figures show a sensing system 10 that includes a vehicle 12 that has a steering device 14 and optionally an elevation device 16 and associated valving 18. The vehicle 12 in a preferred embodiment is a construction vehicle such as a paving machine, a skid steer loader, or the like. A master controller 20 having machine control software 21 is associated with the vehicle 12 by either being in the vehicle, on the vehicle, or the like. The machine control software 21 of the master controller 20 electrically controls the valving 18 and thus the steering device and elevation device 14 and 16 for automated control of the vehicle 12. The master controller 20 additionally has a user interface 22 that allows for manual operation of functions of the system 10.

First and second receivers 24 and 26 are electrically connected and in communication with the master controller 22 via software 28 or a CAN bus that provide CAN messaging between the receivers 24, 26 and master controller 20. Preferably the first and second receivers 24 and 26 receive and read multiple wireless communication signals from sensors 34 provide information to the master controller 20. The software 28 in one embodiment includes application programming interface that interfaces with the software of the receivers to send an electronic signal containing information to the machine control software. Each receiver 24, 26 has first and second transceivers 30 and 32 that in a preferred embodiment are 802.15.4 wireless radio links for bi-directional communication. By having two transceivers the sensor system band width is increased and additionally allows for active scanning of radio channel activity.

A plurality of wireless laser receiver sensors 34 are placed at fixed positions remote to the vehicle 12 on a surface 35a of a fixed object 35b. Each of the plurality of wireless sensors 34 has a wand or transceiver 36 that is preferably 802.15.4 wireless radio link. In this manner the transceiver 36 is in over-the-air communication with a transceiver 30 or 32 of the receivers 24 or 26. In one embodiment the wireless laser receiver sensors 34 receive signals from a flat beam laser transmitter and have a transceiver 36 that sends a wireless signal that is received by a receiver 24 or 26 to send position and distance information to the master controller 20. Based upon this information the master controller 22 then automatically controls the position of the vehicle. By "automatically" applicant means without human interaction and thus the control of the position of the vehicle is performed by the master controller without human input.

Figure 2:
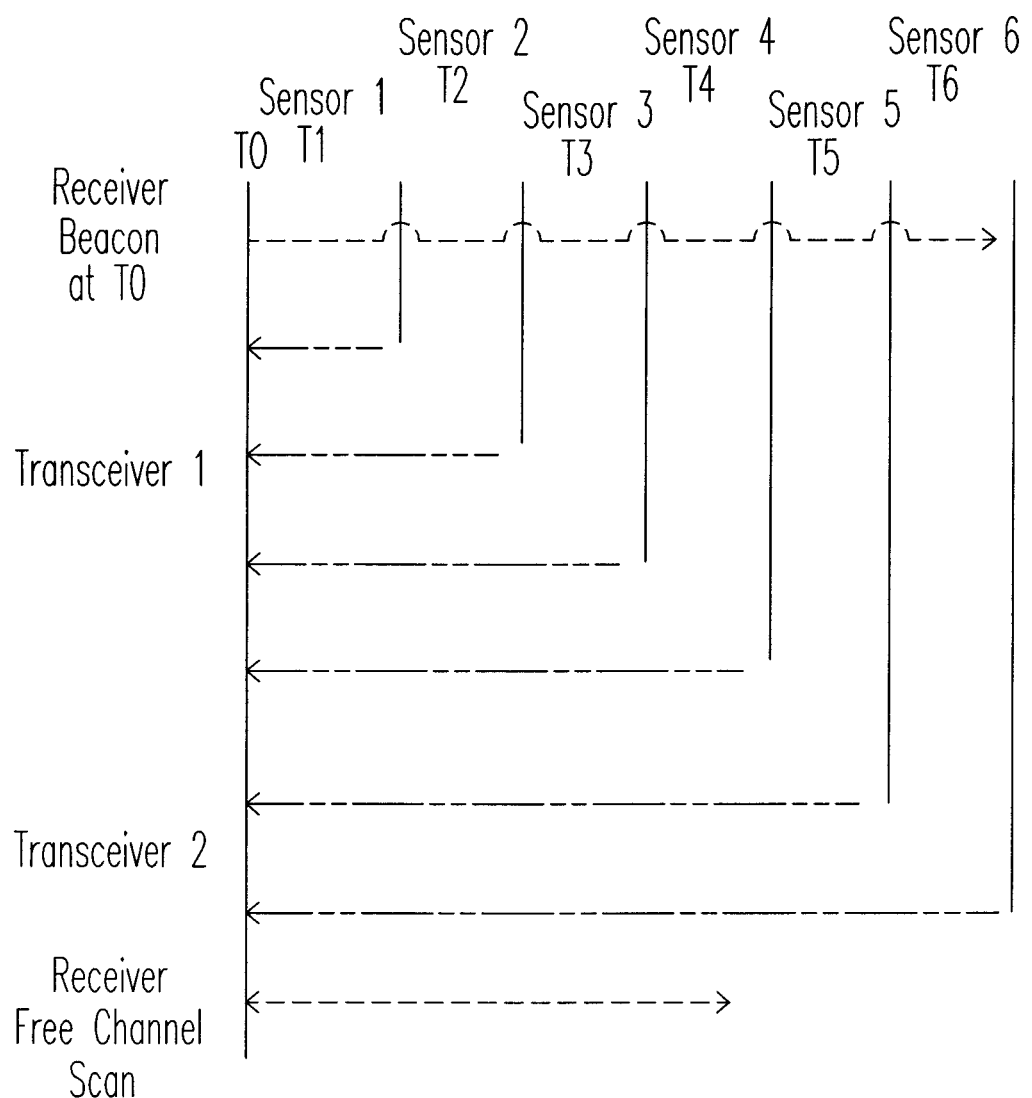
FIG. 2 is a protocol timing graph showing the movement of radio frequencies to and from transceivers of a receiver.
Figure 3:
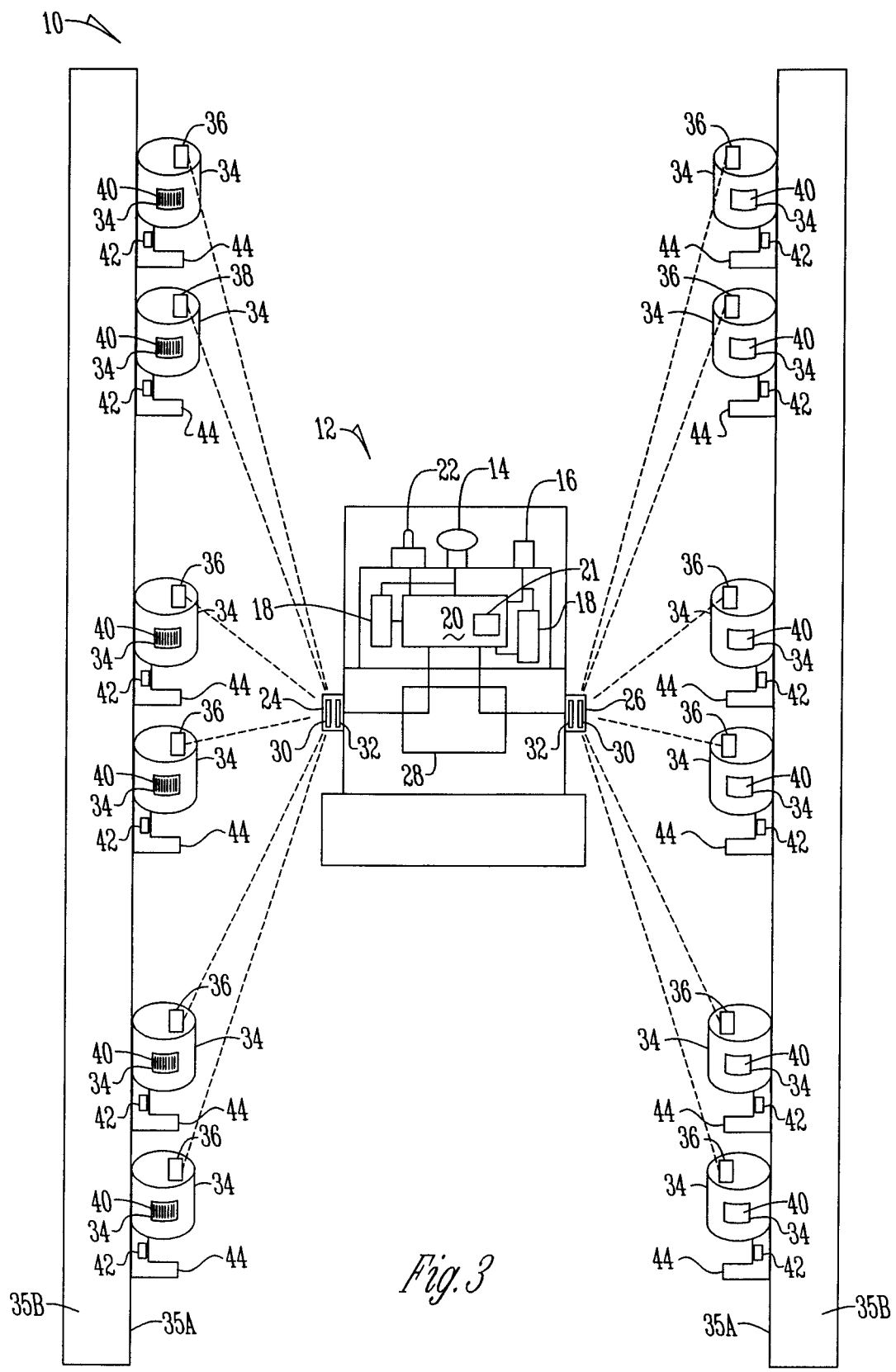
FIG. 3 is a schematic diagram of a sensing system for following a string line or a surface.

In operation, the first transceiver 30 of the first and second receivers 24, 26 transmits a time triggered protocol beacon at time=zero, T0, as shown in FIG. 2. Each of the plurality of wireless sensors 34 responds with its positioning and status data in its respective time slot. Simultaneously the second transceiver 32 of the receivers 24, 26 collects wireless sensor data and scans all radio channels and determines the channel with the least amount of traffic available. At this time the receivers 24, 26 communicate with the plurality of wireless sensors 34 to proactively command the sensors 34 to change to the radio channel with the least amount of traffic. The receivers 24, 26 also sort the sensor data into a CAN message 28 that is then transmitted over a machine control CAN bus to the master controller 20. Based on this communicated data the master controller 20 then selectively actuates the valving 18 of the vehicle 12 in order to automatically control the steering device and elevation device 14, 16 to thus control the steering and elevation of the vehicle 12. Simultaneously the master controller 20 polls the receiver status, all sensors status, and can automatically and manually set the channels through the user interface 22.

Thus provided is a sensing system 10 that can be utilized in order to control the elevation and steering for a vehicle 12 such as a road construction machine for road paving. The transceivers 36 or wands attached to the plurality of wireless sensors 34 sense the machine or vehicle 12 position versus the fixed position of the sensors 34 to provide control input to the elevation or steering control loop of the vehicle 12.

Thus, wireless mechanical sensors are provided. The multiple wireless sensors 34 can be read by the receivers 24, 26 at a very high data rate through the time triggered custom wireless protocol. Additionally, provided is the ability to actively switch to low traffic channels in a direct sequence spread spectrum (DSSS) and the use of an RFID reader 40 in order to read the RFID tag 42 to provide for automated machine sensor location. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A sensing system for an automated vehicle comprising:
    a master controller;
    a receiver associated with the automated vehicle and having a first transceiver and a second transceiver in electric communication with the master controller
    a plurality of fixed wireless laser sensors placed on a surface of a fixed object in over-the-air communication with the first transceiver and the second transceiver of the receiver wherein the first transceiver transmits a time triggered protocol to the plurality of fixed wireless sensors and the plurality of fixed wireless sensors respond with positioning data in a responsive time slot;
    wherein the master controller controls an elevation of the automated vehicle and a steering device of the automated vehicle based on the positioning and distance data received by the first transceiver; and
    wherein the second transceiver is configured to simultaneously collect wireless sensor data, scanning all radio channels, determining a channel with a least amount of traffic, and communicating with the wireless sensors to proactively command the wireless sensors to change to the channel with the least amount of traffic.

2. The sensing system of claim 1 wherein the first transceiver is a wireless radio link.

3. The sensing system of claim 1 wherein the fixed wireless sensor has a transceiver that communicates the information over a radio channel to the first transceiver of the receiver.

4. The sensing system of claim 1 wherein the fixed wireless sensor has an RFID reader.

5. The sensing system of claim 1 wherein the laser sensor is mounted on a surface of an object.

6. The sensing system of claim 1 wherein the master controller automatically positions the automated vehicle based upon the positioning data received by the first transceiver.

7. The sensing system of claim 1 wherein the master controller has a user interface that allows for manual operation of the automated vehicle.

8. The sensing system of claim 1 wherein the first receiver and the second receiver communicate with the master controller via CAN bus.

9. The sensing system of claim 1 wherein the first receiver and second receiver receive and read multiple wireless communication signals from fixed wireless signals.

10. The system of claim 1 wherein the first and second transceiver sort the data received into a CAN message and transmit the sorted data to the master controller.

11. The sensing system of claim 1 wherein the fixed wireless sensor communicates the information in response to receiving the time triggered beacon.

12. The sensing system of claim 11 wherein the receiver communicates the information communicated to the first transceiver to the master controller.

13. The sensing system of claim 12 wherein the master controller automatically steers the vehicle in response to the information communicated to the master controller.

14. The sensing system of claim 13 wherein the vehicle is a road paving machine.

15. The sensing system of claim 1 wherein the master controller is associated with a machine control software.

16. The sensing system of claim 15 wherein the machine control software electrically controls the automated vehicle.

17. A sensing system for an automated vehicle comprising:
    a master controller;
    a receiver associated with the automated vehicle and having a first transceiver and a second transceiver in electric communication with the master controller
    a plurality of fixed wireless sensors placed on a surface of a fixed object in over-the-air communication with the first transceiver and the second transceiver of the receiver wherein the first transceiver transmits a protocol to the plurality of fixed wireless sensors and the plurality of fixed wireless sensors respond with positioning and distance data; and
    wherein the master controller controls the elevation of the automated vehicle and a steering device of the automated vehicle based on the positioning and distance data received by the first transceiver.

18. A sensing system for an automated vehicle comprising:
    a master controller configured to automatically and manually set channels based on a receiver sensor polling system;
    a receiver associated with the automated vehicle and having a first transceiver and a second transceiver in electric communication with the master controller;
    a plurality of fixed wireless sensors placed on a surface of a fixed object in over-the-air communication with the first transceiver and the second transceiver of the receiver wherein the first transceiver transmits a protocol to the plurality of fixed wireless sensors and the plurality of fixed wireless sensors respond with positioning and distance data;
    wherein the master controller is configured to poll the receiver status and all sensors status to form the receiver-sensor polling system; and
    wherein the master controller simultaneously polls while the master controller automatically and manually sets channels.

* * * * *